United States Patent Office 3,576,892
Patented Apr. 27, 1971

3,576,892
PREPARATION OF CYCLOPROPYLMETHYL-CHLORIDE
Charles Ferdinand Huebner, Chatham, and Renat Herbert Mizzoni, Long Valley, N.J., and William Richard Schearer, Carlisle, Pa., assignors to Ciba Corporation, Summit, N.J.
No Drawing. Continuation-in-part of applications Ser. No. 727,657, May 8, 1968, and Ser. No. 767,844, Oct. 15, 1968, which is a continuation-in-part of application Ser. No. 727,682, May 8, 1968. This application Mar. 21, 1969, Ser. No. 809,375
Int. Cl. C07c *17/00, 23/04*
U.S. Cl. 260—648         5 Claims

ABSTRACT OF THE DISCLOSURE

Cyclopropylmethyl chloride or its homologs, which are valuable intermediates or drugs, are prepared by addition of hydrogen bromide to methallyl dichlorides or their homologs and reaction of the resulting 2-bromomethyl-1,3-dichloropropanes with metals.

CROSS-REFERENCES TO RELATED APPLICATIONS

This is a continuation-in-part of application Ser. No. 727,657, filed May 8, 1968, and of application Ser. No. 767,844, filed Oct. 15, 1968, now abandoned, which in turn is a continuation-in-part of application Ser. No. 727,682, filed May 8, 1968, now abandoned.

BACKGROUND OF THE INVENTION

Cyclopropylmethyl chloride, an intermediate in the preparation of a number of valuable products, e.g. pharmacologically active substances, has been prepared according to conventional methods from already cyclic starting materials, e.g. by chlorination of methylcyclopropane or esterification of cyclopropylmethanol with hydrochloric acid, according to Walling and Fredricks et al., J. Am. Chem. Soc. 84, 3326 (1962) or Roberts and Mazur, ibid. 73, 2509 (1951).

Surprisingly, it was found that also trihalogenated alkanes, e.g., the 2-bromomethyl-1,3-dichloropropane, can be cyclized with a metal, leaving the third halogen atom intact, i.e., not forming a considerable amount of the corresponding metal-organic compound.

The pure 2-bromomethyl-1,3-dichloro-propane was previously only obtained by the hazardous reaction of bromodichloromethane with diazo-methane [W. H. Urry et al., J. Am. Chem. Soc. 86, 1815 (1964)]. It was found, however, that it can be more easily obtained from the chlorination product according to L. F. Hatch et al., J. Am. Chem. Soc. 69, 2614 (1947) (which is an almost inseparable mixture of mainly 1,3-dichloro-2-methyl-1-propene and 3-chloro-2-chloromethyl-1-propene, as well as 1,2,3-trichloro-2-methyl-propane and higher chlorinated products) and hydrogen bromide in the presence of a free radical generator. Surprisingly, the desired 2-bromomethyl-1,3-dichloropropane is easily separable from the reaction product.

SUMMARY OF THE INVENTION

The present invention concerns and has for its object the provision of a new process for the preparation of cyclopropylmethyl chloride or its homologs, which comprises reacting 3-chloro-2-chloromethyl-1-propene or its homologs, or in admixture with other halogenated hydrocarbons, with hydrogen bromide in the presence of a free radical generator and reacting the resulting 2-bromomethyl-1,3-dichloropropane or its homologs with metals.

The resulting products are useful as intermediates, preferably in the synthesis of drugs, or as nematocides.

DESCRIPTION OF THE PREFERRED EMBODIMENTS

The preferred process of the invention can be depicted as follows:

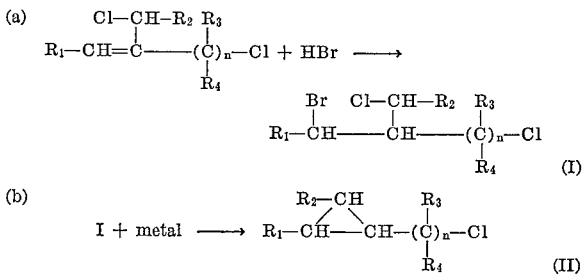

wherein each of $R_1$ to $R_4$ is preferably hydrogen, but also lower alkyl, such as methyl, ethyl, n- or i-propyl or -butyl, and $n$ is preferably the integer 1, but also 2 to about 7.

A free radical generator used in step (a) is, for example, a heavy metal, preferably a paramagnetic metal, e.g. finely divided iron, nickel or cobalt, but also copper or vanadium. Advantageously oxygen or inorganic or organic peroxides are used in the process of the invention, e.g. persulfuric acid, hydrogen peroxide or ascaridol, preferably aliphatic or aromatic percarboxylic acids, e.g. peracetic, perlauric, perbenzoic or monoperphthalic acid, or especially their anhydrides. They are present in the usual amounts, e.g. 0.1–1 molar percent.

The hydrobromination is carried out according to otherwise standard methods, advantageously while exposed to visible or ultraviolet light, in the presence or absence of diluents, preferably such as are inert to the reagents and are solvents thereof, such as unsubstituted or halogenated hydrocarbons and/or aliphatic or aromatic ethers, e.g. low or medium boiling petroleum fractions, such as petroleum ether or n-hexane, preferably cycloalkanes, e.g. cyclohexane, hexahydrotoluene or -xylene, or decahydronaphthalene; benzene, biphenyl, toluene or xylene and/or methylene chloride, carbon tetrachloride, 1,2-dichloroethane, chlorohexanes, chlorobenzenes or -naphthalenes and/or diethyl ether, anisole or diphenyl ether.

The metals used in step (b) are preferably polyvalent, nonprecious metals, their alloys or mixtures, e.g. magnesium, aluminum, nickel or especially zinc alone or in conjunction with other metals, preferably copper, cadmium or mercury. The cyclization is advantageously carried out in a medium which solubilizes the metal-organic intermediate and/or the liberated salts. It preferably is a nonaqueous medium, such as an open or cyclic lower alkanoic acid nitrile, amide or ester, e.g. acetonitrile, dimethylformamide or -acetamide, urea, butyrolactam or acetanilide, ethyl acetate or butyrolactone, alcohols, such as alkanols, e.g. methanol, ethanol or n-decanol, mono- or diethers, e.g. diethyl ether, tetrahydrofuran, 1,4-dioxane or anisole, dialkylsulfoxides, e.g. dimethylsulfoxide and/or mono- or diamines, e.g. ethylene diamine, aniline, toluidine or morpholine, or hydroxy alkylamines, e.g. ethanolamine or di(2-hydroxyethyl)amine.

The process of the invention is carried out according to otherwise standard conditions, e.g. in the presence or absence of other diluents, preferably such as are inert to the reagents and are solvents thereof, such as hydrocarbons, e.g. n-heptane, cyclohexane or toluene, of catalysts and/or inert atmospheres at low or high temperatures, step (a) preferably at room temperature or slightly elevated temperatures, and step (b) preferably between about 25 and 120°, at atmospheric, superatmospheric or reduced pressure. In step (b) chelating agents and/or inorganic or organic bases may be used, such as ammonium or sodium carbonate, bicarbonate, oxalate or tartrate; aliphatic, aromatic or heterocyclic mono- or polyamines, e.g. ammonia, ethylenediamine, tetramethyl ethylenediamine or pyridine, in order to incapacitate the Lewis acids formed and to control pH.

The invention also comprises any modification of the above process, wherein a compound resulting as an intermediate at any stage thereof is used as starting material and the remaining steps are carried out or the process is discontinued at any stage thereof, or in which the starting material is formed under the reaction conditions. Those reagents are preferably used which lead to the products indicated above as the preferred embodiments of the invention.

The starting material is known or, if new, may be prepared according to the methods used for the known products. It may contain 40–60% of the desired 3-chloro-2-chloromethyl-1-propene or its homologs.

The products of the invention can either be used as such or as intermediates in the preparation of valuable products, for example those described in U.S. Pats. Nos. 3,192,200 and 3,385,857. There, the cyclopropylmethyl bromide and its homologs is used. In the analogous manner, an equivalent amount of cyclopropylmethyl chloride or its homologs can be used for the same purpose. Said cyclic compounds of the invention can also be used against intestinal nematodes, e.g. hookworms or ascarids in mammals, preferably domestic animals, such as dogs or sheep, in a single oral dose of about 0.5 to 25 ml., preferably at about 5 to 15 ml. per day. They can be directly applied or in the form of veterinary compositions containing them in conjunction or admixture with inorganic or organic, solid or liquid pharmaceutical excipients, suitable for enteral, e.g. oral, administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols, and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said compositions are prepared by conventional methods and contain about 10 to 95%, more particularly 25 to 75%, of the active ingredients. The compounds of the invention may also be encapsulated in a single capsule, e.g. a standard gelatin capsule, or in multiple microcapsules or coacervates.

The intermediates resulting from reaction (a), i.e., the 2-bromomethyl-1,3-dichloropropanes and their homologs can be used as biocides, preferably pesticides, e.g. bactericides, fungicides, insecticides, acaricides or vermicides alone or in the form of pesticidal compositions, containing them in conjunction or admixture with inorganic or organic, solid or liquid additives, e.g. excipients, solvents, diluents, dispersants, wetting agents, adhesives, fertilizers and/or other pesticides. Spray solutions may be prepared with the use of medium or high boiling petroleum fractions, e.g. kerosene, other hydrocarbons, e.g. xylenes or tetrahydronaphthalenes, coal tar oil or vegetable oils and/or other halogenated hydrocarbons, e.g. tri- or tetrachloroethane, -ethene or -benzenes, having advantageously boiling points above 100°. Advantageous are aqueous emulsions, concentrates, pastes or wettable spray powders. Suitable emulsifiers or dispersants therein are either nonionic or ionic products, e.g. condensation products of ethylene oxide with higher aliphatic alcohols, mercaptans, acids or amines, such as the condensation product of 1 mol ethylene oxide with about 0.04 mol octadecanol, about 0.06 mol decylamine or about 0.08 mol dodecylmercaptan, or sodium dodecylsulfate or dodecylbenzenesulfonate, potassium or triethanol ammonium oleate or abietate, N-cetyl-pyridinium bromide or N,N-bis-hydroxyethyl-N-benzyl-N-dodecylammonium chloride. Dusting or casting preparations may contain the active ingredients in conjunction with talc, kaolin, bentonite, calcium carbonate or phosphate, coal, cork and/or wood powder. Solid preparations may also be granulated or may contain conventional additives that improve the distribution, penetration, adhesion and stability against rain and wind, such as fatty acids, resins, glues, casein and/or alginates.

The following examples are intended to illustrate the invention and are not to be construed as being limitations thereon. Temperatures are given in degrees centigrade and all parts or percentages wherever given are such by weight.

EXAMPLE 1

A 5-liter three-necked flask is charged with 2.0 kg. 42.8% 3-chloro-2-chloromethyl-1-propene (containing an approximately equal quantity of 1,3-dichloro-2-methyl-1-propene besides higher chlorinated products) and 6.5 g. benzoyl peroxide. The stirrer is turned on and hydrogen bromide is introduced into the batch either below the surface, or above the surface if vigorous stirring and mild pressure (about 1.3 at.) is applied, while maintaining the temperature between 20 and 30°. Part way through the addition of the hydrogen bromide, its absorption slows down so that an additional 3 g. benzoyl peroxide are added. When no further hydrogen bromide is being taken up, the solution is allowed to stand overnight at room temperature. In the morning the stirrer is again turned on and 1 liter 10% aqueous sodium hydroxide is cautiously added over a 40-minute period, while maintaining the temperature near 25°. The aqueous phase is allowed to settle out and is discarded. The organic phase is dried over 100 g. anhydrous magnesium sulfate and filtered. The filtrate is distilled through a short, packed column under reduced pressure to yield the following fractions:

| Fraction: | Boiling point, ° | Pressure, mm. Hg. | Weight of fraction, g. |
| --- | --- | --- | --- |
| 1 | 69–80 | 100 | 848.4 |
| 2 | 80–110 | 100 | 149.6 |
| 3 | 82–91 | 20 | 243.2 |
| 4 | 91–95 | 20 | 1,260.0 |

Fractions 1 and 2 contain less than 1%, fraction 3 contains 36.2% and fraction 4 contains 88.3% 2-bromomethyl-1,3-dichloropropane according to gas-chromatography. The latter fraction can further be purified by redistillation in vacuo.

To the mixture of 500 g. 88.3% 2-bromomethyl-1,3-dichloropropane and 2.5 liters tetrahydrofuran, kept under nitrogen, 65 g. magnesium turnings are added portionwise during 1½ hours while stirring and keeping the temperature between 25 and 30°. The magnesium is dissolved after 15 minutes and the mixture is allowed to stand overnight at room temperature. Hereupon 2 liters xylene are added and the mixture distilled on a 38 cm. column under reduced pressure, starting at 180 mm. Hg and finishing at 30 mm. Hg. The distillate is redistilled on a 76-cm. column at the same pressure, to yield a 2.87 kg. forerun containing about 1% cyclopropylmethyl chloride and 183 g. main fraction containing 65% cyclopropylmethyl chloride, 20.2% tetrahydrofuran and 12.6% xylene (according to gas chromatographic analysis).

Said product can be washed with water (in order to eliminate the tetrahydrofuran), dried, filtered and redistilled in order to obtain relatively pure cyclopropylmethyl chloride (about 90%, B.P. 82–90°/760 mm. Hg).

The starting material is obtained as follows: 1.593 kg. 91% methallyl chloride are injected through a flowmeter into a Graham (spiral) condenser, connected with a double jacketed condenser, both preheated with steam to about 105–110°, for which it enters the outer mixer tube and reaction vessel, i.e., a perforated inner tube in a larger outer tube and a double-jacketed condenser respectively, at a rate of 5.5 g. per minute. Simultaneously 1.12 kg. chlorine and 135.92 liters nitrogen are passed through flowmeters, after which both gases are combined, pass a double-jacketed condenser preheated to 105–110°, enter the inner perforated tube of the mixer and the reactor vessel at 3.87 g. and 472 ml. per minute, respectively, thus producing a starting material: chlorine molar ratio of 1.11:1 and a residence time in the reactor of about 3.5 seconds. The temperature in the reactor is kept between 115 and 125° and the effluent passes a bouble-jacketed and a spiral condenser, both chilled with brine, a receiver, a Dry Ice trap and a scrubber absorbing the hydrogen chloride formed. After 4 hours and 50 minutes 2.221 kg. reaction product are collected in the receiver, consisting of 9.4% methallyl chloride (I), 36.0% 3-chloro-2-chloromethyl-1-propene (II), 33.3% 1,3-dichloro-2-methyl-1-propene (III), 17.3% 1,2,3-trichloro-2-methyl-propane (IV), 3.0% 1,2 - dichloro - 2 - methyl-propane (V) and 1.0% high boiling products.

Said product is chilled with brine, treated with 100 g. anhydrous sodium carbonate, the mixture stirred for ½ hour and filtered. The filtrate is combined with 2.5 g. hydroquinone and distilled through a 90-cm. column at diminishing pressure, yielding the following fractions:

|           | Temp., °C. | Pressure, mm. Hg | Weight, g. |
|-----------|------------|------------------|------------|
| Fraction: |            |                  |            |
| 1         | 67–106     | 760              | 141.8      |
| 2         | 106–118    | 760              | 26.2       |
| 3         | 55–89      | 100              | 1,447.8    |
| 4         |            |                  | 428.2      |

Fraction 3 consists of 50.7% II, 42.3% III, 4.2% IV and 2.8% V, and fraction 1 consists of 92.3% I, thus providing 36.4% of theory of II, based on unrecovered I. Said 50.7% fraction II can be blended with the earlier obtained 36% product, in order to obtain the above 42.8% product.

EXAMPLE 2

Through the solution of 2 g. of 85% 3-chloro-2-chloromethyl-1-propene and 46.4 mg. of benzoyl peroxide in 2 ml. cyclohexane, a fine stream of gaseous hydrogen bormide is bubbled for 1¼ hours and the reaction mixture is allowed to stand at room temperature overnight. (Gas chromatography of a sample of the crude mixture indicates only 15% remaining starting material.) It is diluted with cyclohexane, washed with water and aqueous sodium bicarbonate, dried over magnesium sulfate, filtered and evaporated below 50° in the vacuum of a water jet pump, to yield the 2-bromomethyl-1,3-dichloropropane as residue; it is 94.5% pure according to gas chromatography and NMR.

To 12.5 g. magnesium turnings, kept under nitrogen, the solution of 103 g. 94.5% 2-bromomethyl-1,3-dichloropropane in 500 ml. dry tetrahydrofuran is added portionwise while stirring. The rate of addition is such that the reaction temperature is maintained between 25 and 30°. After the consumption of magnesium, the mixture is allowed to stand for 3 hours at room temperature. It is filtered and the residue washed with tetrahydrofuran, to yield 534 g. of a filtrate containing (besides the magnesium salts formed), 5.8% cyclopropylmethyl chloride, 2.2% starting material and 92% tetrahydrofuran (according to gas-chromatographic analysis). Said filtrate can be distilled at atmospheric pressure, to yield a fraction boiling between 64–68° containing less than 5% cyclopropylmethyl chloride and such boiling between 68–81° containing more than 5% thereof, besides tetrahydrofuran.

EXAMPLE 3

Above the surface of 37 g. 54.2% 3-chloro-2-chloromethyl-1-propene and 0.2 g. benzoyl peroxide, hydrogen bromide is introduced at 20° and ⅓ at. while stirring, and the hydrobromination is continued at about 18–23° and about ⅕–⅓ at. while cooling, until the theoretical uptake has been reached (if necessary, with an additional amount of peroxide). Hereupon the pressure is increased to atmospheric pressure and nitrogen is introduced until the excess hydrogen bromide is eliminated. To the mixture, 16.5 ml. 10% aqueous sodium hydroxide are added during 10 minutes while stirring and stirring is continued for 30 minutes. The organic phase is separated, dried over anhydrous magnesium sulfate, combined with 20 mg. hydroquinone and rectified on an appropriate column, to yield the following fractions:

|           | Boiling point, ° | Pressure, mm. Hg | Weight, g. | Percent 2-bromomethyl-1,3-dichloropropane |
|-----------|------------------|------------------|------------|-------------------------------------------|
| Fraction: |                  |                  |            |                                           |
| 1         | ≦95              | 100              | 11.1       | 1.59                                      |
| 2         | 45–95            | 20               | 5.1        | 40.7                                      |
| 3         | 95–97            | 20               | 26.6       | 94.5                                      |

To the mixture of 22.6 g. 94.5% 2-bromomethyl-1,3-dichloropropane and 100 ml. tetrahydrofuran, kept under nitrogen, 3.06 g. magnesium turnings are added portionwise while stirring and keeping the temperature between 25 and 30°. Hereupon the mixture is stirred at room temperature until the Grignard test is negative. It is heated to about 40° to dissolve some precipitate and 29 g. dioxane are added dropwise while stirring and slowly cooling to room temperature, in order to precipitate the salts formed. They are filtered off, washed with 40 ml. cold tetrahydrofuran-dioxane, to yield 103.6 g. filtrate containing 8.3% cyclopropylmethyl chloride.

EXAMPLE 4

The mixture of 50 ml. 3% hydrochloric acid and 37.5 g. zinc powder is stirred until the evolution of hydrogen ceases. Hereupon the solution of 8.2 g. copper II sulfate pentahydrate in 500 ml. water is added and stirring is continued until the blue color disappears. The mixture is decanted, the residue washed twice with 50 ml. portions of water, then twice with 50 ml. portions of dimethylformamide. 32.7 g. of the zinc-copper obtained is added to 380 ml. dimethylformamide and the suspension obtained heated to 60° while stirring. Hereupon 88 g. 2-bromomethyl-1,3-dichloropropane are added followed by the mixture of 30 g. ethylene diamine and 120 ml. dimethylformamide, which mixture is added at such a rate that the temperature stays around 70°. After the addition the reaction mixture is stirred at 60° until a sample of the suspended solids does not show any gas evolution upon treatment with 10% hydrochloric acid. The mixture is evaporated in vacuo, and the distillate obtained is fractionated through a 1 m. by 15 mm. column packed with 6 mm. glass helices and the fraction boiling at 82–90°/760 mm. Hg collected; it represents about 90% pure cyclopropylmethyl chloride.

EXAMPLE 5

The mixture of 30 g. ethylene diamine and 120 ml. dimethylacetamide is slowly added at 70° to the stirred mixture of 32.7 g. zinc-copper couple (containing 2% Cu), 310 ml. dimethylacetamide and 89 g. 88.3% 2-bromomethyl-1,3-dichloropropane, and the mixture kept at said temperature for 18 hours. Exhaustive distillation of the mixture under reduced pressure yields a product which contains 7.4% cyclopropylmethyl chloride. It can be fractionated as described in Example 4.

EXAMPLE 6

To the mixture of 32 g. zinc dust, 500 ml. dimethyl formamide and 89 g. 94.5% 2-bromomethyl-1,3-dichloropropane, 30 g. ethylene diamine are added at 70° while stirring and the mixture is kept at this temperature for 2 hours and 15 minutes. It is filtered, to yield a filtrate containing 4.9% cyclopropylmethyl chloride. It is distilled through a 90 cm. column and the fraction boiling at 34–85°/150 mm. Hg collected; it contains 89.6% cyclopropylmethyl chloride.

EXAMPLE 7

Above the surface of 239 g. 45–47% 3-chloro-2-chloromethyl-1-propene and 1.1 g. benzoyl peroxide, hydrogen bromide is introduced at 20° and 175 mm. Hg until the pressure rises to about 600 mm. Hg. Hereupon the stirrer is turned on and hydrogen bromide added at such a rate that the temperature can be maintained between 18 and 22°, and the pressure is held between 500 and 600 mm. Hg. During the addition of the final ⅓ theoretical amount of hydrogen bromide, the pressure is gradually increased to about 1.3 at. and the mixture stirred overnight at room temperature. Hereupon the vessel is flushed with nitrogen and the mixture combined with the solution of 8 g. 50% aqueous sodium hydroxide in 32 ml. water while stirring for 15 minutes. The organic phase is separated, combined with 0.26 g. hydroquinone and distilled. The fractions boiling up to 95°/100 mm. Hg at a reflux-distillation ratio of 3:1, and at 83–85°/20 mm. Hg at a ratio of 10:1 are discarded, the residue cooled to 20°, treated with 1.7 g. charcoal and filtered, to yield 95–96% pure 2-bromomethyl-1,3-dichloropropane.

To the mixture of 1.3 g. copper sulfate pentahydrate, 120 ml. water and 0.54 ml. concentrated hydrochloric acid, 5.9 g. zinc dust are added while stirring virogously for 2 minutes. It is filtered and the residue washed with 20 ml. water and twice with 20 ml. dimethylformamide. It is added to the mixture of 62 ml. dimethylformamide and 15 g. 2-bromomethyl-1,3-dichloropropane at 60° while stirring. Hereupon the solution of 5.2 g. anhydrous ethylenediamine in 19.2 ml. dimethylformamide is added during 1 hour at 58–62° while stirring, stirring is continued for 1 hour at 67–70° and the mixture allowed to stand overnight at 16°. It is filtered and the residue washed 2 times with 20 ml. dimethylformamide. The filtrate is distilled and the fraction boiling at 78°/70 mm. Hg collected, to yield a distillate containing 11–12% cyclopropylmethyl chloride in dimethylformamide. This mixture is fractionated at atmospheric pressure and the fraction boiling at 70–120° at a reflux distillation ratio of 3:1 collected, to yield about 86% cyclopropylmethyl chloride in dimethylformamide.

What is claimed is:

1. The process for the preparation of cyclopropylmethyl chloride, which comprises reacting 2-bromomethyl-1,3-dichloropropane with metals selected from magnesium, aluminum, nickel and zinc alone or in conjunction with copper, cadmium or mercury, in a liquid selected from an open or cyclic lower alkanoic acid nitrile, amide or ester, an alkanol, an open or cyclic mono- or diether and a dialkylsulfoxide alone or in the presence of a mono- or diamine.

2. Process as claimed in claim 1, wherein the metal used is magnesium.

3. Process as claimed in claim 1, wherein the metal used is zinc alone or in conjunction with copper.

4. Process as claimed in claim 1, wherein the reaction is performed with magnesium in tetrahydrofuran.

5. Process as claimed in claim 1, wherein the reaction is performed with zinc or zinc-copper in a mixture of dimethylformamide or acetamide and ethylene diamine.

References Cited

Urry et al.: J. Am. Chem. Soc. 86, 1815–1819 (1964).

DANIEL D. HORWITZ, Primary Examiner

U.S. Cl. X.R.

260—652